Dec. 22, 1953    G. E. GARD    2,663,790
MOLD STRUCTURE FOR DIELECTRIC HEATING
Filed June 25, 1951    2 Sheets-Sheet 1

INVENTOR
GEORGE E. GARD
by Walter J. Kaufman
ATTORNEY

Dec. 22, 1953

G. E. GARD 2,663,790

MOLD STRUCTURE FOR DIELECTRIC HEATING

Filed June 25, 1951

INVENTOR
GEORGE E. GARD by
Walter F Kaufman

ATTORNEY

Patented Dec. 22, 1953

2,663,790

UNITED STATES PATENT OFFICE 2,663,790

MOLD STRUCTURE FOR DIELECTRIC HEATING

George E. Gard, Lancaster, Pa., assignor to Armstrong Cork Company, Lancaster, Pa., a corporation of Pennsylvania Application June 25, 1951, Serial No. 233,460

6 Claims. (Cl. 219—47)

The present invention relates to a mold structure for dielectric heating and is concerned particularly with a mold for use in the dielectric heating of materials where the mold wall is formed of a dielectric material and is heated together with a charge disposed in the mold, the mold wall being heated to avoid heat losses which normally occur at the surfaces of the mass in contact with the mold walls. One method of compensating for such heat losses is disclosed in Scott Patent 2,526,697, wherein there are provided peripheral conductors which are disposed around the outer perimeter of the mold walls and are electrically connected to the electrodes, serving to establish an intensified field of force in the mold walls and the portions of the mass under treatment which are disposed in engagement with the mold walls and normally lose heat to the mold walls. The mold walls may be formed from hardwood impregnated with a waterproofing material such as ceresin wax, as disclosed in Scott Patent 2,526,698.

With a mold structure of the type mentioned above, wherein the mold wall is formed of a dielectric material and the peripheral conductors are provided in contact therewith or disposed closely adjacent thereto in order to effect proper intensification of the field of force in the mold walls, there is present the possibility of arcing occurring between the peripheral conductors adjacent to the mold wall, and this may result in the carbonization of the mold wall and its virtual destruction.

An object of the present invention is to provide a mold structure including peripheral conductors in which dielectric heating of the mass and the mold wall may be effected simultaneously without fear of damage to the mold wall which might result if arcing were to occur between the peripheral conductors.

A further object of the invention is to provide a mold structure with discharge conductors disposed around the outer perimeter of the mold wall and spaced outwardly therefrom, the discharge conductors being spaced from one another a distance less than the distance between peripheral conductors provided adjacent to the mold wall for establishing an intensified field therein.

Other objects of the invention will become apparent from consideration of the following detailed description of the invention.

According to the invention there is provided a mold wall of dielectric material with upper and lower peripheral conductors disposed around the outer perimeter of the mold wall and spaced from one another. These conductors are preferably disposed in contact with the mold wall. Upper and lower discharge conductors are disposed around the outer perimeter of the mold wall, and these are spaced outwardly from the peripheral conductors and are electrically connected thereto. The discharge conductors are spaced from one another a distance less than the distance between the peripheral conductors. The mold is provided with upper and lower electrodes which are electrically connected to the peripheral conductors and are spaced from one another a distance greater than the distance between the peripheral conductors. This provides a mold structure in which the mass to be heated is disposed in the mold between the spaced electrodes, and a field of force is established between the electrodes, the peripheral conductors, and the discharge conductors. Since the spacing between the peripheral conductors is less than the spacing between the electrodes and such peripheral conductors are disposed outside of the mold wall or at least that portion thereof in contact with the mass under treatment, the mold wall will have established therein a more intensive field of force than the field of force established within the mass to be molded, as disclosed in Scott Patent 2,526,697. The discharge conductors which are spaced closer together than the peripheral conductors will create a field of force in air and, therefore, will have no harmful effect upon the creation of the more intensive field in the mold walls. However, should there be any tendency toward arcing, it will occur in the zone of the discharge conductors rather than in the zone of the peripheral conductors, and thus damage to the mold wall will be obviated. This is due to the fact that the voltage gradient between the discharge conductors will be in excess of the voltage gradient between the peripheral conductors.

Certain embodiments of the invention are illustrated in the attached drawings, in which.

Figure 1:
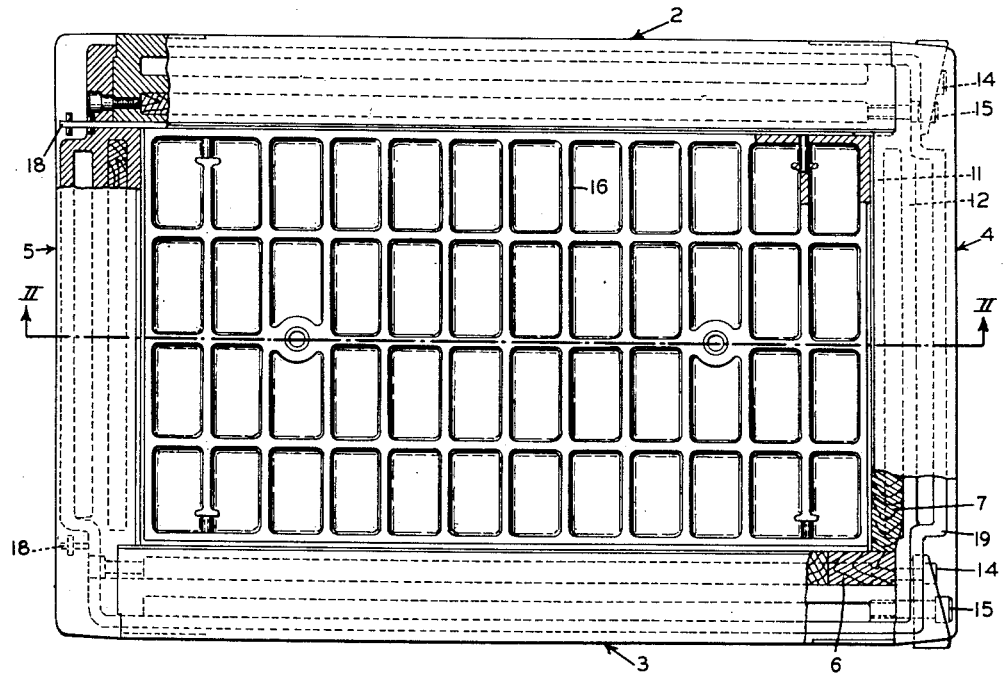
Figure 1 is a top plan view of a mold embodying the present invention.
Figure 2:
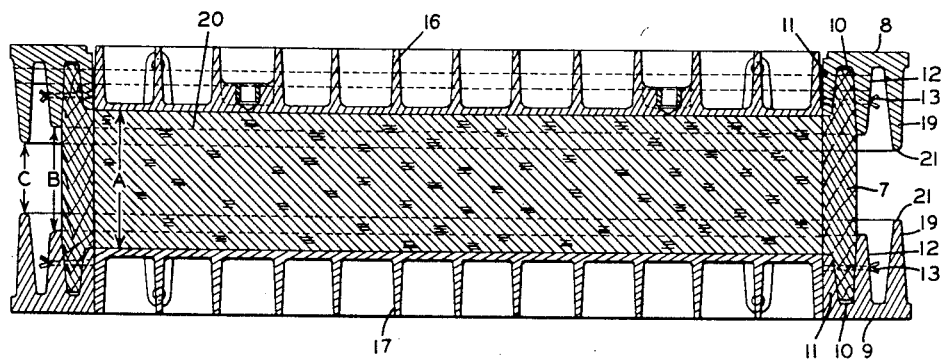
Figure 2 is a sectional view taken on the line II—II of Figure 1.

Referring to Figure 1, there is shown a mold of the type disclosed and claimed in the copending application of Louis H. Lockwood, Serial No. 200,560, filed December 13, 1950 now Patent No. 2,625,710, and entitled "Mold Structure." The mold includes side wall members 2 and 3 and end wall members 4 and 5. Each of the side wall members 2 and 3 is made up of a plurality of pieces of dielectric material such as pieces 6 of hardwood disposed as panels. The end wall members are similarly fabricated from pieces of dielectric material 7. Each of the wall members includes an upper frame member 8, as shown in Figure 2, and a lower frame member 9. Pockets 10 are provided between flange 11 and peripheral conductor 12. The dielectric panels 6 and 7 are received within the pockets of the frames, and the parts are joined by pins 13 which extend through the flanges, the dielectric panels, and the peripheral conductors. The wall members are mechanically fastened together with machine screws 14 and 15, as indicated in Figure 1.

The mold is provided with an upper electrode 16 and a lower electrode 17, the upper electrode being held in position by locking keys 18.

The structure shown in Figures 1 and 2 is more fully described and illustrated in the Lockwood application referred to above.

It will be observed by reference to Figure 2 that there is provided on each of the frame members a projecting web 19 which constitutes a discharge conductor. This discharge conductor is spaced outwardly from the peripheral conductors 12; and when the wall members are joined together, as shown in Figure 1, the discharge conductors 19 will extend around substantially the entire periphery of the mold wall, except for the limited areas where the fastenings 14 and 15 are received within openings in the frame members, as shown at the corners in Figure 1.

In this structure the distance between the electrodes 16 and 17 has been indicated by the letter A, the distance between the peripheral conductors by the letter B, and the distance between the discharge conductors by the letter C. The distance A is greater than distance B, and distance C is less than distance B. Thus when the electrodes 16 and 17 are connected to a source of high-frequency alternating electric current for the dielectric heating of the mass 20 disposed within the mold, a more intensive field of force will be established in the dielectric mold walls than in the mass due to the fact that the peripheral conductors are spaced from one another a distance B which is less than the spacing A between electrodes. This action is fully set forth in Scott Patent 2,526,697. The peripheral conductors are disposed in contact with the mold walls, but danger from arcing between the peripheral conductors at the mold walls is obviated by the provision of the discharge conductors which are spaced outwardly from the peripheral conductors and from the mold walls and are spaced from one another a distance C which is less than the distance B between the peripheral conductors and the distance A between the electrodes 16 and 17.

It is preferred to have the terminal edges 21 of the discharge conductors rounded so as to eliminate any points or sharp projections which would serve to increase the voltage gradient and foster arcing.

Figure 3:
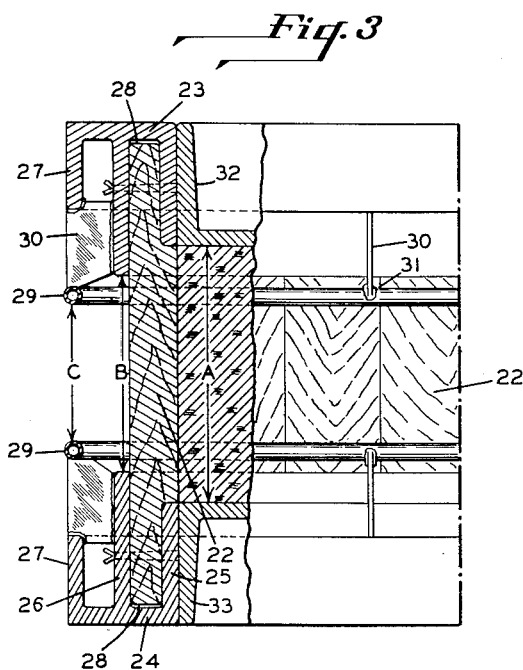
Figure 3 is a partial view of a modified mold structure with portions thereof shown in section and remaining portions shown in elevation.

Figure 3 shows a modified structure embodying the present invention in which there are provided mold walls 22 which may be made of hardwood impregnated with ceresin wax, similar to the panels 6 and 7. Frame members 23 and 24 are provided, each of which includes a flange 25, a peripheral conductor 26, and a reinforcing web 27 disposed outwardly from the peripheral conductor 26. The wooden wall members 22 are received within pockets 28 provided in the frame members and defined by the flanges 25 and the peripheral conductors 26. Discharge conductors 29 are provided which in the embodiment illustrated are in the form of hollow copper tubing electrically connected to the peripheral conductor 26 by supporting brackets 30 which are welded to the peripheral conductor 26 and to the flanges 27. The discharge conductors are welded or brazed to the brackets 30 as indicated at 31 in Figure 3. In this embodiment electrodes 32 and 33 are provided which are electrically connected to the frame members 23 and 24, and the spacing between these electrodes indicated as the distance A is greater than the spacing between the peripheral conductors indicated by the letter B, and the spacing of the discharge conductors indicated by the letter C is less than the spacing between the peripheral conductors. The principle of operation of this modification is the same as the embodiment shown in Figures 1 and 2. This structure, however, permits the provision of discharge conductors extending around the entire periphery of the mold; whereas, with the structure of Figures 1 and 2, the conductors are cut back at the corners to permit fastening together of the frame members.

Figure 4:
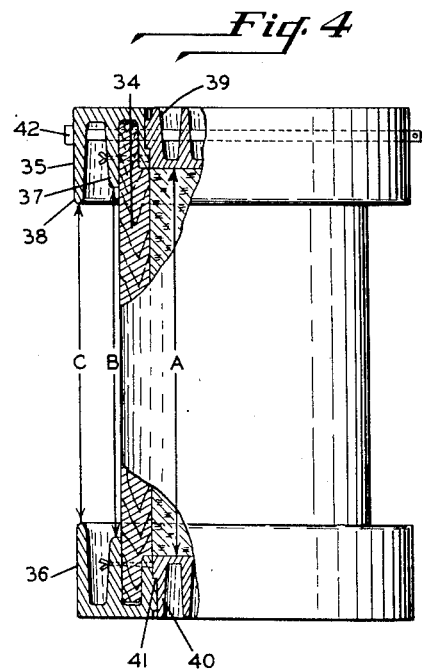
Figure 4 is a view similar to Figure 3 showing a modified mold structure embodying the present invention and useful in the formation of cylindrical bodies.

Figure 4 shows a further modification of the invention in which the mold is of generally hollow cylindrical shape to provide for the molding of cylindrical bodies of cork composition, for instance. The mold wall 34 may be formed of impregnated hardwood as in the other embodiments, and the frame members 35 and 36 may be integrally cast to provide peripheral conductors 37 and discharge conductors 38. Electrodes 39 and 40 are provided, the lower electrode 40 being held in position by a projecting shoulder 41 provided on the lower frame member 36, and the upper electrode being held in position against upward movement by locking key 42 passing through the frame member 35 and the electrode 39. In this embodiment of the invention, the distance A between the electrodes is more than the distance B between the peripheral conductors 37, and the distance C between the discharge conductors 38 is less than the distance between the peripheral conductors. The discharge conductor and the peripheral conductor being integrally formed are electrically connected, and the upper and lower electrodes are connected to their respective frame members by interengagement therewith and by the locking key 42. In this embodiment of the invention, as in the embodiment of Figure 3, the discharge conductors 38 extend around the entire perimeter of the mold without interruption, and any arcing which may be occasioned will occur between the discharge conductors rather than between the peripheral conductors which lie in engagement with the mold wall.

Preferred practice is to make the frame members as iron castings with integral webs constituting the peripheral conductors and discharge conductors, for by so doing a rigid structure is fabricated. This is particularly desirable where the mass to be treated is confined within the mold under substantial pressure. The invention, however, is not limited to this type of structure, for the peripheral conductors and the discharge conductors may be formed separately from the frame members, if such be provided, with the upper discharge conductor and the upper peripheral conductor being connected to the upper electrode and the lower electrode being electrically connected to its lower peripheral conductor and discharge conductor.

I claim:

1. In a mold for the dielectric heating of materials, the combination of a mold wall of dielectric material; metal frames secured to the upper and lower edges of the mold wall and embracing the same on the outer surface thereof as upper and lower peripheral conductors disposed around the outer perimeter of the mold wall and spaced from one another; upper and lower discharge conductors disposed around the outer perimeter of the mold wall, spaced outwardly from the mold wall, electrically connected to said upper and lower peripheral conductors, respectively, and spaced from one another a distance less than the distance between said peripheral conductors; and upper and lower electrodes received within said mold wall, electrically connected to said upper and lower metal frames, respectively, and spaced from one another a distance greater than the distance between said peripheral conductors.

2. In a mold for the dielectric heating of materials, the combination of mold walls of dielectric material; multiwebbed metal frames secured to the upper and lower edges of the mold walls, a web on each of the frames embracing the mold walls on the outer surface thereof as upper and lower peripheral conductors disposed around the outer perimeter of the mold walls and spaced from one another, a second associated web on each of the frames spaced outwardly from the mold walls, disposed around the outer perimeter of the mold walls as upper and lower discharge conductors, and spaced from one another a distance less than the distance between said peripheral conductors, each peripheral conductor and its associated discharge conductor being electrically connected; and upper and lower electrodes received within said mold walls, electrically connected to said upper and lower multiwebbed metal frames, respectively, and spaced from one another a distance greater than the distance between said peripheral conductors.

3. In a mold for the dielectric heating of materials, the combination of mold walls of dielectric material disposd as a parallelpiped open at the top and bottom; multiwebbed metal frames secured to the upper and lower edges of the mold walls, a pair of spaced webs on each of the frames receiving the mold walls therebetween, with one of said webs of each of said frames embracing the mold walls on the outer surface thereof as upper and lower peripheral conductors disposed around the outer perimeter of the mold and spaced from one another, the other of said pair of webs embracing the mold walls on the inner surface thereof and spaced from one another a distance greater than the distance between the peripheral conductors, a third associated web on each of the frames spaced outwardly from the mold walls, disposed around the outer perimeter of the mold walls as upper and lower discharge conductors, and spaced from one another a distance less than the distance between said peripheral conductors, each peripheral conductor and its associated discharge conductor being electrically connected; and upper and lower electrodes received within the open top and bottom of said mold walls, electrically connected to said upper and lower multi-webbed metal frames, respectively, and spaced from one another a distance greater than the distance between said peripheral conductors.

4. In a mold for the dielectric heating of materials, the combination of a mold wall of dielectric material; upper and lower peripheral conductors disposed around the outer perimeter of the mold wall and spaced from one another; upper and lower discharge conductors disposed around the outer perimeter of the mold wall, spaced outwardly from the peripheral conductors, electrically connected to the upper and lower peripheral conductors, respectively, and spaced from one another a distance less than the distance between said peripheral conductors; and upper and lower electrodes electrically connected to said upper and lower peripheral conductors, respectively, and spaced from one another a distance greater than the distance between said peripheral conductors.

5. In a mold for the dielectric heating of materials, the combination of a mold wall of dielectric material; upper and lower peripheral conductors disposed around the outer perimeter of the mold wall and spaced from one another; associated upper and lower discharge conductors of rounded configuration disposed around the outer perimeter of the mold wall, spaced outwardly from the respective associated peripheral conductors, and spaced from one another a distance less than the distance between said peripheral conductors; electrically conductive metal brackets electrically connected to said upper and lower peripheral conductors and said upper and lower discharge conductors, respectively, and securing said discharge conductors in spaced relationship with respect to said respective associated peripheral conductors; and upper and lower electrodes electrically connected to said upper and lower peripheral conductors, respectively, and spaced from one another a distance greater than the distance between said peripheral conductors.

6. In a mold for the dielectric heating of materials, the combination of a hollow cylindrical mold wall of dielectric material; upper and lower annular peripheral conductors disposed around the outer perimeter of the mold wall and spaced from one another; upper and lower annular discharge conductors disposed around the outer perimeter of the mold wall, spaced outwardly from the mold wall, electrically connected to said upper and lower annular peripheral conductors, respectively, and spaced from one another a distance less than the distance between said peripheral conductors; and upper and lower electrodes received within said mold wall, electrically connected to said upper and lower annular peripheral conductors, respectively, and spaced from one another a distance greater than the distance between said peripheral conductors.

GEORGE E. GARD.

References Cited in the file of this patent

UNITED STATES PATENTS

| Number | Name | Date |
|---|---|---|
| 2,521,797 | Klingaman | Sept. 12, 1950 |
| 2,521,808 | Taylor | Sept. 12, 1950 |
| 2,526,697 | Scott, Jr. | Oct. 24, 1950 |

FOREIGN PATENTS

| Number | Country | Date |
|---|---|---|
| 619,398 | Great Britain | Mar. 9, 1949 |